(12) United States Patent
Goebel et al.

(10) Patent No.: US 7,933,754 B2
(45) Date of Patent: Apr. 26, 2011

(54) SYSTEM AND METHOD FOR DAMAGE PROPAGATION ESTIMATION

(75) Inventors: Kai Frank Goebel, Mountain View, CA (US); Neil Holger White Eklund, Schenectady, NY (US); Hai Qiu, Clifton Park, NY (US); Weizhong Yan, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 1174 days.

(21) Appl. No.: 11/608,036

(22) Filed: Dec. 7, 2006

(65) Prior Publication Data

US 2008/0140360 A1 Jun. 12, 2008

(51) Int. Cl.
*G06G 7/48* (2006.01)
(52) U.S. Cl. .......................................................... 703/6
(58) Field of Classification Search ........................ 703/6
See application file for complete search history.

(56) References Cited

U.S. PATENT DOCUMENTS

| | | |
|---|---|---|
| 5,210,704 A | 5/1993 | Husseiny |
| 6,466,877 B1 | 10/2002 | Chen et al. |
| 6,519,534 B2 | 2/2003 | Chen et al. |
| 6,748,341 B2 | 6/2004 | Crowder, Jr. |
| 6,853,951 B2 | 2/2005 | Jarrell et al. |
| 6,928,370 B2 | 8/2005 | Anuzis et al. |
| 7,027,953 B2 | 4/2006 | Klein |
| 2004/0236450 A1 | 11/2004 | Bryant et al. |
| 2004/0236563 A1 | 11/2004 | Rachlin |
| 2005/0165520 A1 | 7/2005 | Ariyur |
| 2005/0171736 A1 | 8/2005 | Kang |

OTHER PUBLICATIONS

Jianhui Luo et al., "Model-based prognostic techniques", 2003, Autotestcon 2003, IEEE Systems Readiness Technology Conference, pp. 330-340.*
Silvio Simani, "Identification and fault diagnosis of a simulated model of an industrial turbine", Aug. 2005, IEEE Transactions on Industrial Informatics, vol. 1, No. 3, pp. 202-216.*
Kai Goebel et al., "Fusing competing prediction algorithms for prognostics", Jul. 2006, 2006 IEEE Aerospace Conference, pp. 1-10.*
Carl S. Byington et al., "A model-based approach to prognostics and health management for flight control actuators", 2004, IEEE Aerospace Conference, pp. 3551-3562.*
Amanda L. Cundy, "Use of response surface metamodels in damage identification of dynamic systems", 2003, Los Alamos National Laboratory, pp. 1-77.*
A. Stamatis et al., "Adaptive Simulation of Gas Turbine Performance," ASME Journal of Engineering of Gas Turbines and Power, vol. 112, Apr. 1990, pp. 168-175.
N. Aretakis et al., "Nonlinear Engine Component Fault Diagnosis From a Limited Number of Measurements Using a Combinatorial Approach," ASME Journal of Engineering of Gas Turbines and Power, vol. 125, Jul. 2003, pp. 642-650.
W. Yan et al., Flight Regime Mapping for Aircraft Engine Fault Diagnosis, Proceedings of the 58th Meeting of the Society of Mechanical Failures Prevention Technology, Apr. 26-30, 2004.

* cited by examiner

*Primary Examiner* — Jason Proctor
*Assistant Examiner* — Russ Guill
(74) *Attorney, Agent, or Firm* — Penny A. Clarke

(57) ABSTRACT

A method to estimate damage propagation is disclosed. The method includes making available a set of input parameters to a computational model, executing the computational model with defined changes within a range of an input parameter of the set of input parameters to define a range of at least one modeled output, receiving at least one signal responsive to and representative of a respective one of an actual sensor output, and estimating damage propagation based upon a correlation of the received signal to the modeled output.

20 Claims, 9 Drawing Sheets

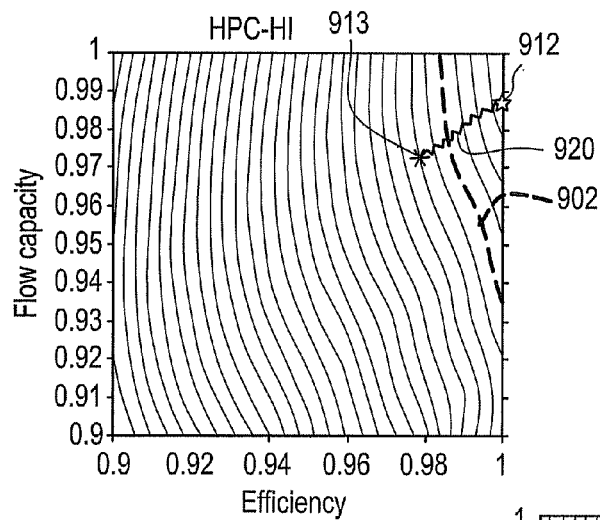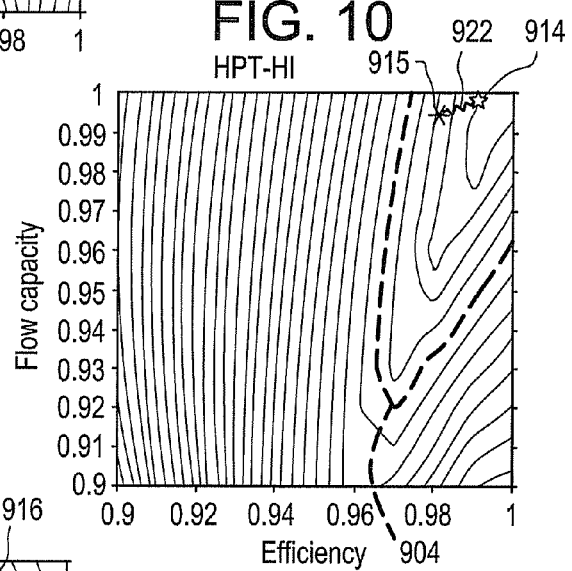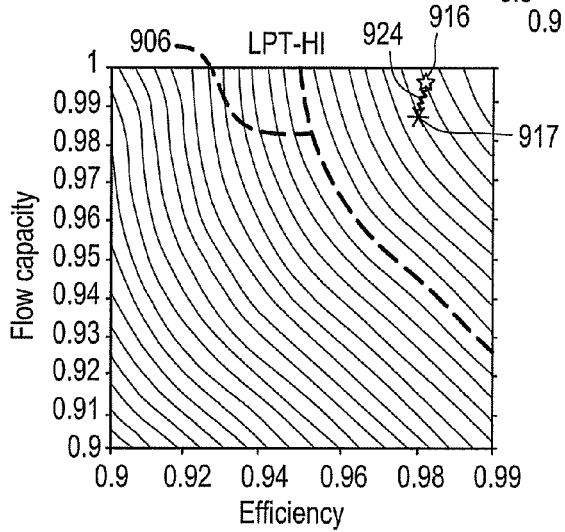

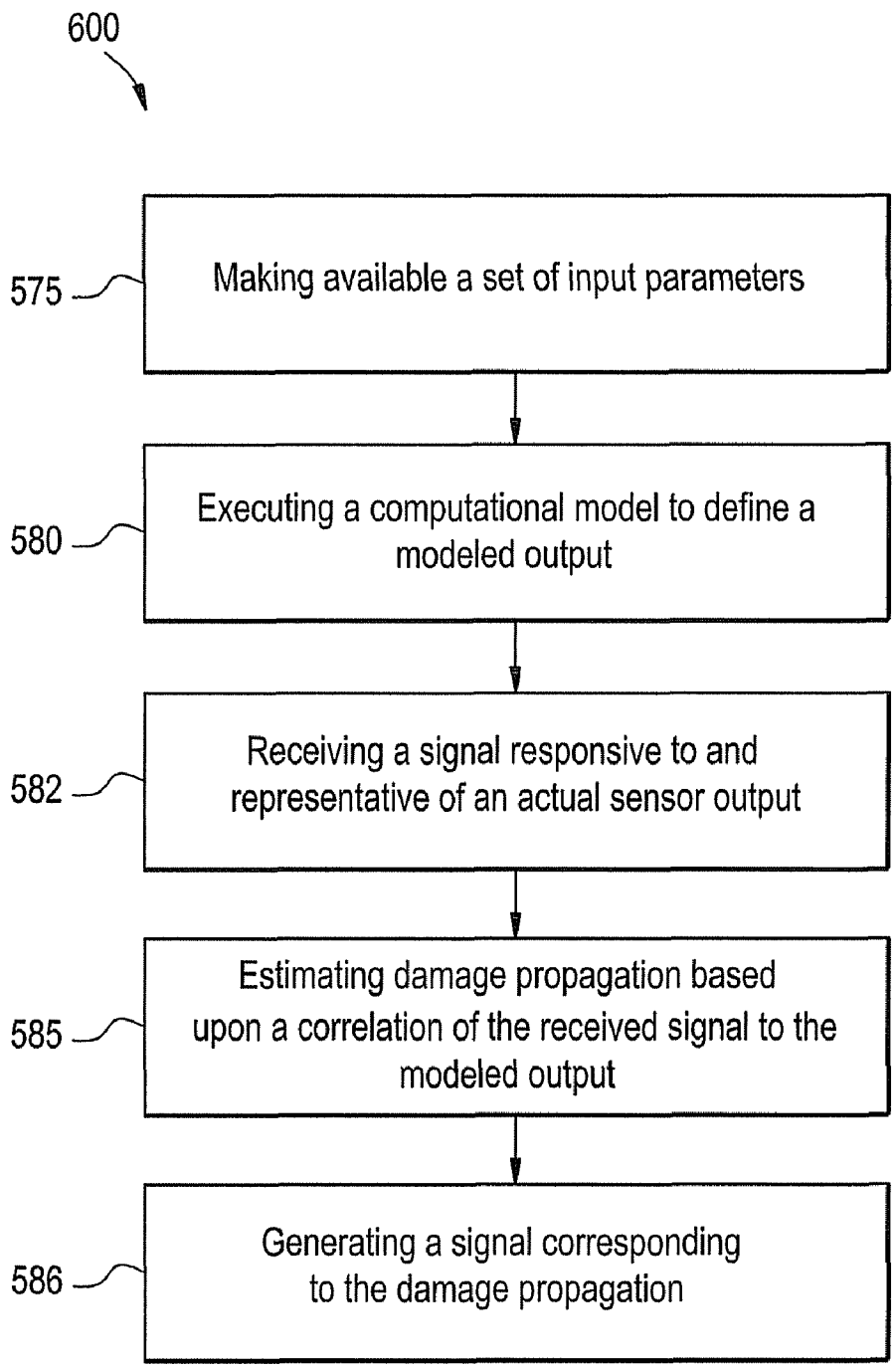

SYSTEM AND METHOD FOR DAMAGE PROPAGATION ESTIMATION

BACKGROUND OF THE INVENTION

The present disclosure relates generally to damage propagation estimation and remaining useful life (RUL) estimation. The present disclosure relates in particular to situations in which a physics-based model of failure is not specifically known. This may be true at a system or subsystem level.

Estimating how the damage to an equipment will change over time, possibly as a function of conditions that may impact the rate of change, is imperative in understanding when an equipment will reach its end of useful life. Estimating the RUL of equipment is known in the art as prognostics. RUL estimates provide valuable information for operation of modern complex equipment. RUL estimates provide decision making aids that allow operators to change operational characteristics (such as load) which, in turn, may prolong a life of the equipment. RUL estimates also allow planners to account for upcoming maintenance and set in motion a logistics process that supports a smooth transition from faulted to fully functioning equipment. Predicting remaining useful life is not straightforward because, ordinarily, RUL is conditional on future usage conditions, such as load and speed, for example. Examples of equipment that may benefit from the use of RUL estimates are aircraft engines (both military and commercial), medical equipment, and power plants, for example.

A common approach to prognostics is to employ a materials level model of damage propagation contingent on future use. Such a model is often times based on detailed materials knowledge and makes use of finite element modeling. Because such models are extremely costly to develop, they must be limited to a few important parts of a system, but are rarely applied to all parts within a system.

Another approach to prognostics is a data-driven approach that takes advantage of time series data where equipment behavior has been tracked via sensor outputs during normal operation all the way to an end of equipment useful life. The end of equipment useful life can represent a totally non-functioning state of the equipment, for example, equipment failure, which in turn may result in system failure. The end of equipment useful life can also represent a state of the equipment wherein the equipment no longer provides expected results. When a reasonably sized set of these observations exists, pattern recognition algorithms can be employed to recognize these trends and predict RUL. These predictions are easier under the assumption of near-constant future operating conditions. However, such run to end of equipment useful life data are often not available because, when the observed system is complex, expensive, and, safety is important, such as aircraft engines, for example, faults will be repaired before they lead to the end of equipment useful life. This deprives the data driven approach from information that is necessary for its proper application.

Accordingly, there is a need in the art for a life estimation arrangement that overcomes these limitations.

BRIEF DESCRIPTION OF THE INVENTION

An embodiment includes a method to estimate damage propagation. The method includes making available a set of input parameters to a computational model, executing the computational model with defined changes within a range of an input parameter of the set of input parameters to define a range of at least one modeled output, receiving at least one signal responsive to and representative of a respective one of an actual sensor output, and estimating damage propagation based upon a correlation of the received signal to the modeled output.

Another embodiment includes an estimation system for estimating damage propagation. The system includes a database comprising a set of input parameters, a processor in signal communication with the database, and a computational model application for executing on the processor, the computational model performing a method. The method includes defining a range of at least one modeled output based upon a range of an input parameter of the set of input parameters, receiving at least one signal responsive to and representative of a respective one of an actual sensor output, and estimating damage propagation based upon a correlation of the received signal to the modeled output.

BRIEF DESCRIPTION OF THE DRAWINGS

Referring to the exemplary drawings wherein like elements are numbered alike in the accompanying Figures:

FIG. 9, FIG. 10, and FIG. 11 depict exemplary contour charts including flow and efficiency test result trajectories in accordance with an embodiment of the invention;

FIG. 14 depicts a flowchart of a method for estimating damage propagation in accordance with an embodiment of the invention.

DETAILED DESCRIPTION OF THE INVENTION

Figure 1:
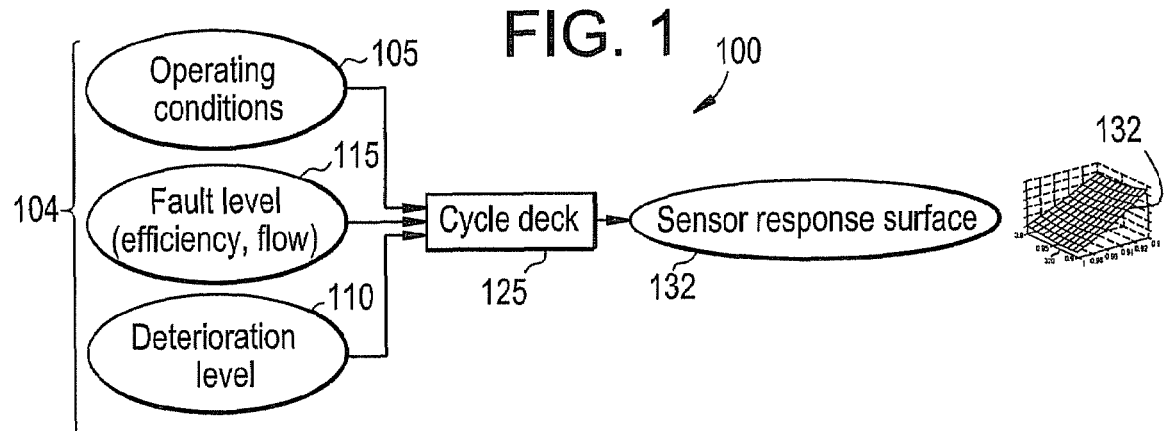
FIG. 1 depicts a schematic flowchart of an off-line training process in accordance with an embodiment of the invention.

An embodiment of the invention will provide an equipment level prognostics approach without needing to assess a physics based model that defines damage propagation of the equipment. As used herein, the term "equipment" shall refer to a system, a subsystem within a system, a component of either the system or subsystem, or a part. In an embodiment, the equipment level prognostics approach will operate in an absence of complete run to end of equipment useful life time series data.

An embodiment of the invention will utilize a hybrid model-based and data-driven approach to address the particular challenges of a low-sampling rate of operational data available and to capitalize on thermo-dynamic engine models. An embodiment of the invention will provide a damage propagation model for estimating RUL of turbine engine equipment. In an embodiment, response surfaces, also herein referred to as response maps, of sensors are generated via a cycle deck as a function of variations of flow and efficiency of the equipment. In an embodiment, the response maps are normalized and superimposed. In an embodiment, the sensor readings are matched to the superimposed response maps, and an optimization approach is used to determine a corresponding flow and efficiency pair that best explains the sensor data.

In an embodiment, flow and efficiency pairs determined over time are compared to define a trajectory direction and rate of change. In an embodiment, the whole trajectory is then projected into a time domain and an extrapolation of a curve resulting from the projection to a limit yields the estimated equipment end of life. The time between the current time step and the estimated end of life is the estimated RUL. In an embodiment a backward chaining mode discretizes the extrapolation of the curve to retrieve estimated future efficiency and flow pairs. In an embodiment, the retrieved pairs are then input to a cycle deck to produce future expected sensor readings as well as confirmatory trips of operational margins. Differences between the future expected sensor readings with real sensor readings are used to adjust the RUL calculations. In an embodiment, a variation of flows and efficiencies is used to quantify an uncertainty of the RUL output.

As used herein, the term "prognostics" shall refer to the prediction of remaining useful equipment life. The remaining useful life (RUL) predictions are in units of time or cycles such as startup, operation, and shutdown of an engine, for example, as in a flight of an aircraft. The time prediction typically has an associated uncertainty that is described as a probability density curve around an actual prediction. Operators can choose a confidence level that allows them to incorporate a risk level into their decision making. Typically, the confidence level on RUL estimates increases as a prediction horizon decreases, such as toward an approach of an end of equipment life, for example.

Prognostics is closely linked to diagnostics. As used herein, the term "diagnostics" shall refer to a detection of a fault condition, or an observed change in an operational state that is in related an abnormal event. Faults can be a first sign of a potential end of equipment useful life at some future time. An example of such a fault is an increase in engine fuel consumption resulting indirectly from a distressed turbine section. A direct cost of an end of equipment useful life is unavoidable: ultimately, a component must be replaced. Moreover, there are indirect costs to the end of equipment useful life that are in many cases greater than the direct cost of repair. One source of indirect costs is secondary damage. For example, an end of the useful life of a component in a compressor stage of a gas turbine can cause damage to rear stages of the gas turbine. Another indirect cost is unscheduled maintenance. It is often less expensive to replace a faulty component during scheduled maintenance before it has reached the end of its useful life than to have a component reach the end of its useful life in the field, which may result in unscheduled maintenance and possibly operational disruption.

In an absence of any evidence of damage or a faulted condition, prognostics reverts to statistical estimation of fleet-wide life, such as Weibull curves or other suitable mechanisms. It is more common to employ condition-based prognostics in a presence of an indication of abnormal wear, faults, or other non-normal situation. It is therefore important to include accurate and responsive diagnostics to provide a trigger point for prognostic algorithms to operate.

Condition-based prediction systems depend on reliable fault diagnostics to initiate the prognostic algorithms. If diagnostics recognizes a start point of damage too late, damage propagation models may lag reality and underestimate an amount of damage. If prognostic algorithms are initiated when there is no real damage, the benefit of RUL prediction is reduced. Accordingly, presence of an accurate diagnostic fault detection algorithm will be assumed as a basis for an embodiment of a prognostic RUL prediction.

An embodiment of the process is broken down into an off-line training process to develop models used for damage propagation estimation, and an on-line monitoring process to utilize the developed models for estimating the damage propagation.

Referring now to FIG. 1, a schematic flowchart 100 of an embodiment of the off-line training process is depicted.

In an embodiment, the off-line training process will begin with an input of a set of input parameters 104 that may include equipment operating conditions 105, various deterioration levels 110 that describe a state of wear of the equipment, and various fault levels 115, at varying magnitudes, to a physics based computational model 125 of the equipment. In an embodiment, the computational model 125 is a thermodynamic computational model 125 of an aircraft engine, also herein referred to as a cycle deck 125. In an embodiment, the equipment is an aircraft engine, and the operating conditions 105 are referred to as flight envelope points, and include conditions such as altitude, throttle position, speed, and air temperature, for example. In an embodiment, the faults 115 are defined as combinations of efficiency and flow. In an embodiment, the equipment may include turbine engine equipment, such as a high pressure compressor (HPC), a high pressure turbine (HPT), and a low pressure turbine (LPT), for example.

In an embodiment, the process will continue by observing an output of the cycle deck 125 in response to defined changes by defined increments within a range of an input parameter of the set of input parameters 104. For example, the input parameter may be increased by a defined, relatively small increment, such as 0.1 for each run, for execution of the cycle deck 125, within a defined range of 0 to 1.0, for example. In an embodiment, the cycle deck 125 will define a set of sensor response surfaces 132, also herein referred to as a set of response maps of the modeled sensor output that will each define an expected sensor output, also herein referred to as a modeled sensor output, as a function of the two input parameters, such as efficiency and flow, for example.

In an embodiment, the sensor response surfaces 132 will define the expected sensor output as a function of flow and efficiency for equipment of the turbine engine. In an embodiment, the sensor response surfaces 132 are generated by a plurality of cycle deck 125 simulations. For a first set of the plurality of cycle deck 125 simulations, a first input parameter of the set of inputs 104 changes. In an embodiment, the first input parameter is an efficiency parameter of the fault levels 115 and changes in defined increments of a first range, defined by upper and lower limits, such as between 1.0 and 0.9, for example. For a second set of the plurality of cycle deck 125 simulations, a second input parameter of the set of inputs 104 changes. In an embodiment, the second input parameter is a flow parameter of the fault levels 115 and changes in defined increments of a second range, defined by upper and lower limits, such as between 1.1 and 0.9, for example. It will be appreciated that in response to some faults, in some equipment, the flow can increase. Therefore in an embodiment the flow levels are changed in defined increments between 1.1 and 0.9. Accordingly, the expected sensor outputs from the equipment will define the sensor response surfaces 132 in terms of flow and efficiency for each sensor.

While an embodiment of the invention has been described as estimating damage propagation of an aircraft engine via faults defined by combinations of efficiency and flow, it will be appreciated that the scope of the invention is not so limited, and that the invention will also apply to damage propagation estimation arrangements that may use other parameters, such as impedance, temperature and vibration, for example. Further, while an embodiment of the invention has been described performing a first set of cycle deck simulations while varying the efficiency input within a defined range of 1.0 and 0.9 and a second set of cycle deck simulations while varying the flow input within a defined range of 1.1 and 0.9 it will be appreciated that the scope of the invention is not so limited, and that the invention will also apply to other life estimation arrangements that may alter the order of simulation, or the boundary limits of the defined ranges.

Figure 2:
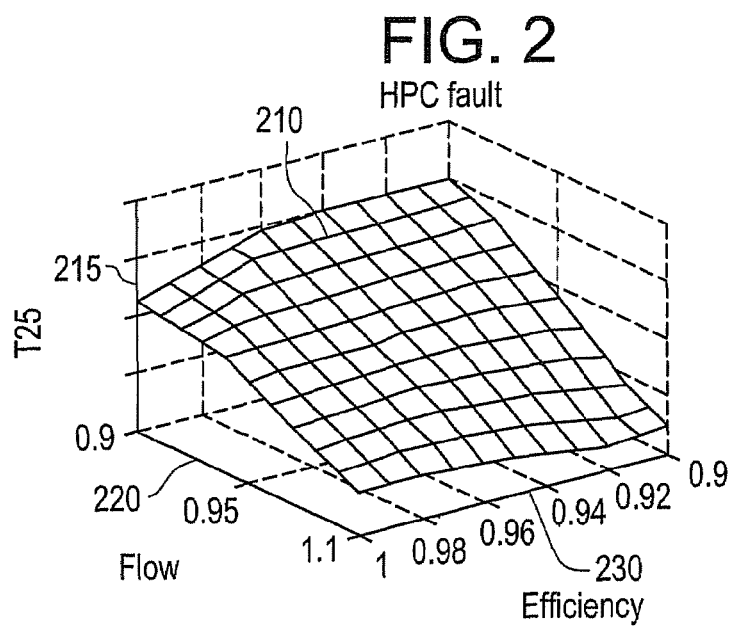
FIG. 2 and FIG. 3 depict two charts including exemplary sensor response surfaces in accordance with an embodiment of the invention.
Figure 3:
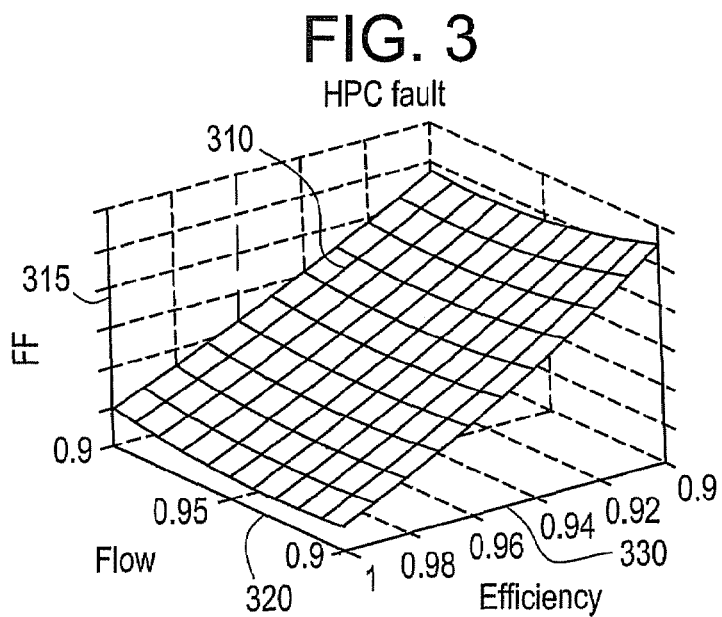

Referring now to FIG. 2 and FIG. 3, two illustrative examples of response surfaces are depicted for the HPC equipment. It will be appreciated that the equipment may include more than two response surfaces, such as a response surface corresponding to each sensor within the equipment, for example. Referring now to FIG. 2, an embodiment of a response surface 210 that relates to a temperature reading T25 is depicted. In this example, T25 is a compressor inlet temperature. It will be appreciated that the response surface 210 relates the temperature along a first axis 215 with a flow along a second axis 220, and the temperature with an efficiency along a third axis 230. Accordingly, it will be appreciated that given a specific temperature reading, the corresponding coordinates of efficiency and flow will be disposed upon the response surface 216. Referring now to FIG. 3, an embodiment of a response surface 310 that relates to a fuel flow quantity is depicted. It will be appreciated that the response surface 310 relates the fuel flow along a first axis 315 with the flow along a second axis 320, and the fuel flow with the efficiency along a third axis 330. Accordingly, it will be appreciated that given a fuel flow reading, the corresponding coordinates of efficiency and flow will be disposed upon the response surface 310. It will be appreciated that the equipment may have more than two response surfaces 132, and that each response surface 132 will correspond to an output of each sensor, corresponding to an operating characteristic of the equipment. Further, it will be appreciated that response surfaces for other equipment are defined in a similar manner.

While an embodiment of the invention has been described using a response surface having two dimensions to determine two variables, it will be appreciated that the scope of the invention is not so limited, and that the invention will also apply to life estimation arrangements that may utilize response functions having more dimensions, such as three, four, five, or more dimensions to determine three, four, five, or more variables.

Figure 4:
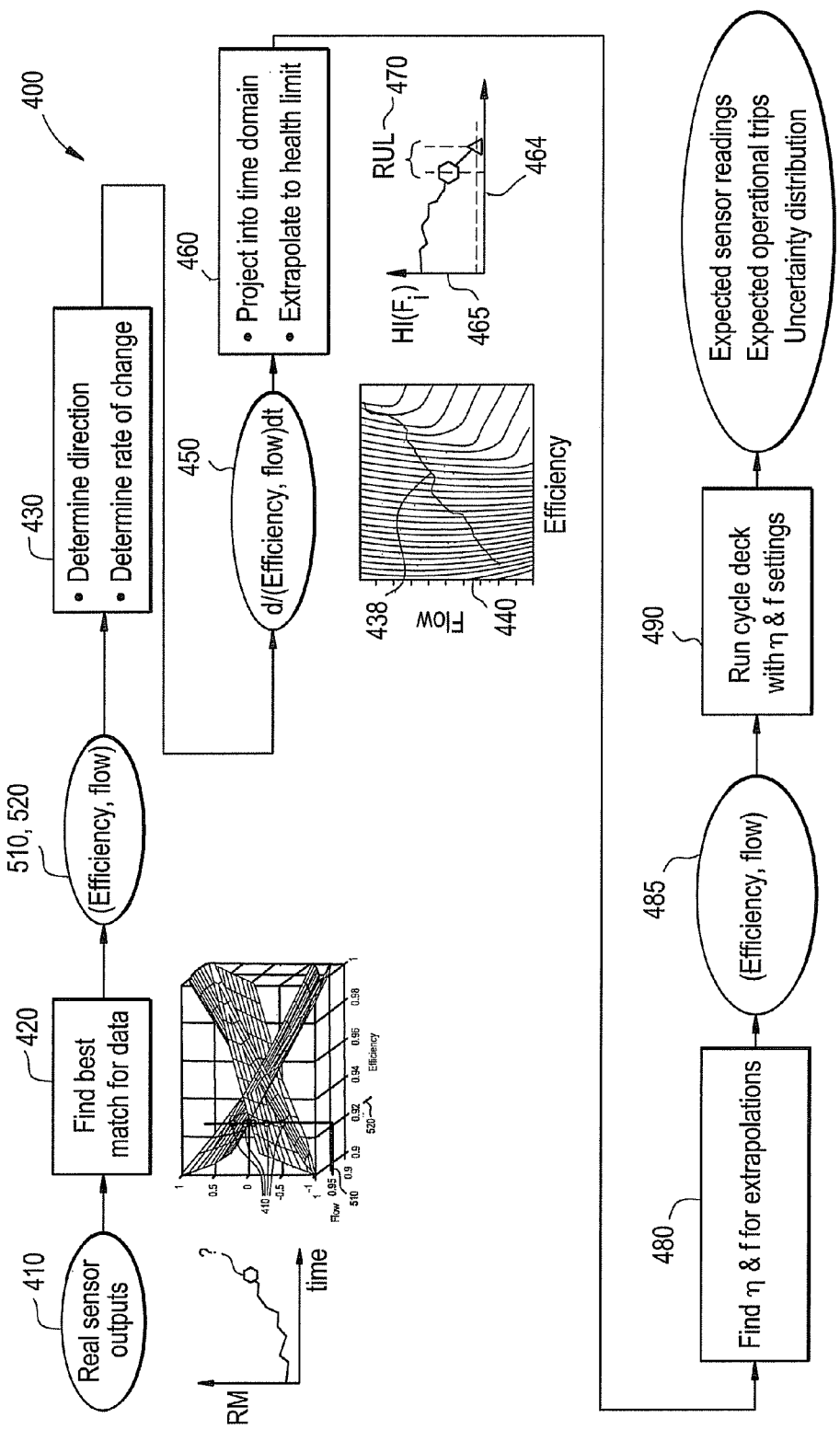
FIG. 4 depicts a schematic flowchart of an on-line monitoring process in accordance with an embodiment of the invention.

The on-line monitoring process is intended to utilize actual data collected during operation of the equipment. Referring now to FIG. 4, a schematic flowchart 400 of the on-line monitoring process is depicted.

In an embodiment, the on-line monitoring process begins with collecting, or receiving at least one signal that is responsive to a corresponding real sensor output 410, also herein referred to as an actual sensor output, as they vary with time. Sensor outputs may also be referred to as remote monitoring (RM) parameters. In an embodiment, the process continues with normalizing each real sensor output 410 and corresponding response surface 132 with respect to a reference value to define a normalized real sensor value and a normalized response surface. In an embodiment, the reference value is a maximum value of the respective response surface 132, and the normalized real sensor value and normalized response surface are within a range from zero to one. Normalizing the sensor outputs and response surfaces 132 will provide a common scale to superimpose together the response surfaces 132 that otherwise have varying units and values.

Figure 5:
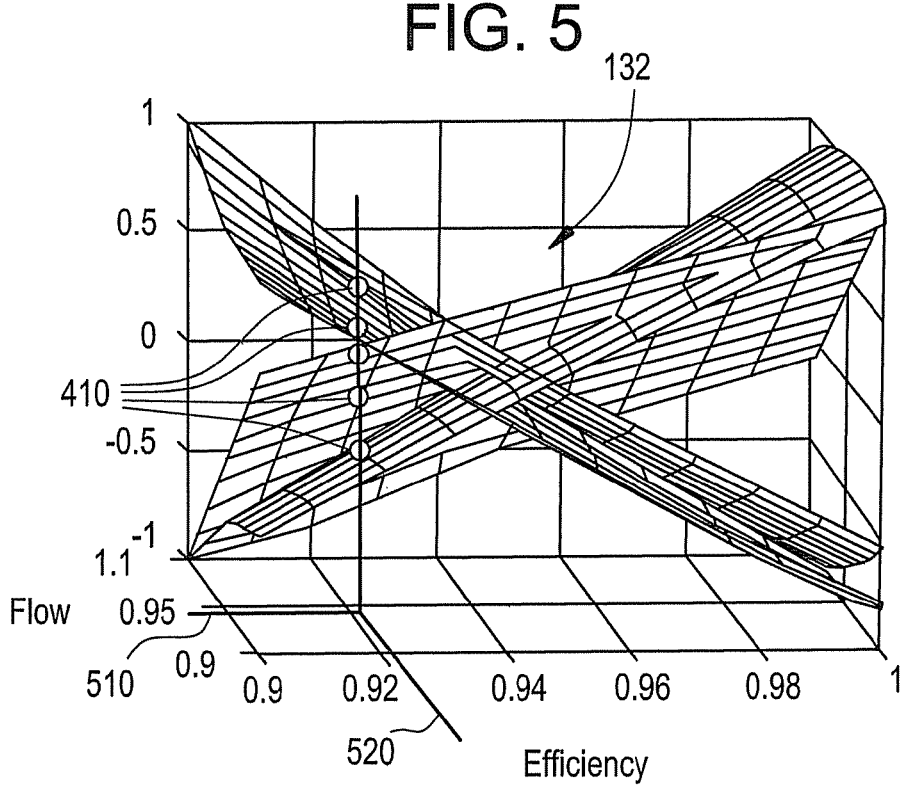
FIG. 5 depicts a set of normalized and superimposed response surfaces in accordance with an embodiment of the invention.

Referring now to FIG. 4 in conjunction with FIG. 5, it will be appreciated that more than one response surface 132 of the equipment are normalized and superimposed together. The real sensor outputs 410 are each shown on a corresponding response surface 132. In an embodiment, the method proceeds by finding a best match 420 of the real sensor outputs 410 with the corresponding response surfaces 132 to define a single health related estimated pairing of efficiency and flow to relate the various real sensor outputs 410. It will be appreciated that the best match refers to an overall match. That is, the real sensor outputs 410 may not all fall perfectly upon all corresponding response surfaces 132, but that tradeoffs including small errors for individual matches between corresponding real sensor outputs 410 and response surfaces 132 provide the best overall match. In an embodiment, the single estimated pairing will provide a corresponding estimated flow 510 and estimated efficiency 520 for the equipment based upon the various real sensor outputs 410. In an embodiment, finding the best match 420 can be stated as an optimization problem to be optimized by applying an objective function such that the sum of the distances squared of the real sensor outputs 410 to their respective response surface is minimized, where the objective function is written as:

$$\min(\Sigma w_i(\text{dist}_i)^2), i\epsilon\{\text{characteristic}\} \qquad \text{equation-1}$$

where the $w_i$ is a specific weighting function, $\text{dist}_i$ are the distances from a specific measurement, such as an estimated best match to the real sensor output 410 disposed upon the respective response surface 132, for example, and characteristic refers to a set of different operating characteristic of each response surface 132 that may be measured by the real sensor outputs 410.

In an embodiment, the process continues by comparing a current best matching pairing of efficiency and flow, (efficiency, flow), with a previously determined best matching (efficiency, flow) pairing. Comparing the current pairing with the previously determined pairing will define a change in the estimated pairing and provide for a determination 430 of a direction and a rate of change of the efficiency and flow over time. A chart 440 depicts a trajectory 438 resulting from changes 450 of efficiency and flow over time. In an embodiment, the direction of the trajectory 438 in the efficiency-flow space is determined in response to the presence of a fault, as determined by diagnostics. Stated alternatively, the direction of the changes over time in the estimated pairing are interpreted to define a diagnostic finding. In an embodiment, it will be appreciated that different fault modes can result in different trajectories 438 in the flow and efficiency space shown in the chart 440.

Figure 6:
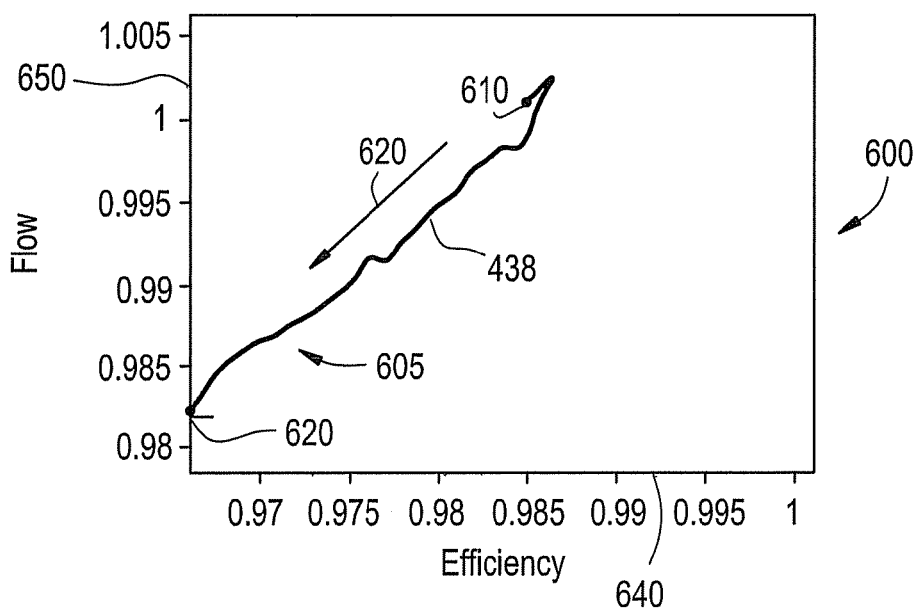
FIG. 6 depicts a chart including an exemplary efficiency and flow trajectory in accordance with an embodiment of the invention.

Referring now to FIG. 6, a chart 600 including an efficiency axis 640 and a flow axis 650, depicts an example of the trajectory 438. The trajectory 438 includes a plurality of points 605, with each point representing a pairing of efficiency and flow coordinates at a different time, as described above, and shown in the chart 440. It will be appreciated that the trajectory 438 includes a start point 610 an end point 620, which each represent a specific pairing of efficiency and flow coordinates. It will be further appreciated that the trajectory 438 includes a plurality of pairings of efficiency and flow taken at different points in time, such that, over time, they will change in a general direction as indicated by a direction line 620. It will be appreciated that the slope and spacing between individual points of the plurality of points 605, and the general direction of the trajectory 438 will be dependent upon the type and severity of fault as well as the corresponding damage propagation that has occurred. The trajectory 438 depicted in FIG. 4 and FIG. 6 includes data points that have been substantially smoothed for clarity of illustration, and that the raw, or actual data resulting from equation-1 representing the trajectory 438 will include greater scatter than is depicted in FIG. 4 and FIG. 6.

In an embodiment, the time rate of change 450 in the efficiency-flow space is observed and recorded for the trajectory 438. In an embodiment, for each pairing of efficiency and flow, a minimum operational condition for each of a set of margins is calculated, and a value associated with each margin is checked. As used herein, the term "margin" is used to represent the quantification of the proximity of an operational attribute to an operational limit of the equipment of interest. In an embodiment of a turbine aircraft engine, typical examples of margins may include LPT Clearance margin, HPT S1 Clearance margin, HPT S2 Clearance margin, Core speed margin, Exhaust Gas Temperature (EGT) margin, HPT inlet temperature margin, HPT outlet temperature margin, Fan stall margin, HPC stall margin, HPC pressure ratio margin, and Booster stall margin, for example. It will be appreciated that the foregoing examples are for illustration, and not limitation of the current invention.

In an embodiment, the minimum operational condition, or a minimum margin value, for each aircraft engine margin includes an operational limit, such as maximum core speed, for example, that is calculated and checked corresponding to at least one specific operating condition 105. In an embodiment, the specific operating condition 105 may include such operating conditions 105 that are known as a hot day take-off, a maximum climb, and cruise conditions, for example. It will be appreciated that the foregoing examples are for illustration, and not limitation of the current invention. In an embodiment, some margins, such as core speed margin and EGT margin are capable to be derived from real sensor outputs 410, while other margins, such as clearance and stall margin for example, cannot easily be derived from real sensor outputs 410 with current technology. In an embodiment, the cycle deck 125 is used to calculate those margins that cannot be derived from real sensor outputs 410 for inclusion in a health assessment process, as described further below. Therefore, a complete and systematic health estimation, which takes into account all possible margins, can be achieved.

Figure 7:
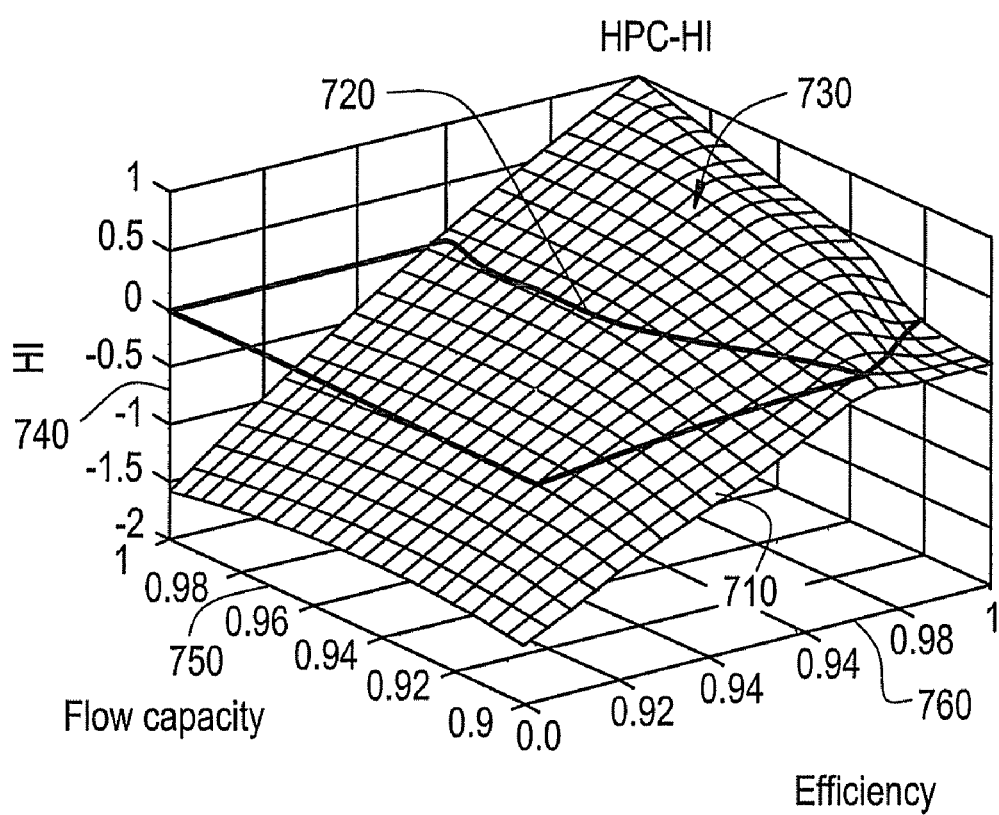
FIG. 7 depicts a chart including an exemplary normalized minimal margin surface in accordance with an embodiment of the invention.

In an embodiment, a value of a given margin, as may be determined either by a derivation from the real sensor output 410 or via simulation of the cycle deck 125, will be normalized, such that it will have a value between zero and one. A zero normalized margin value will indicate a violation of the operational attribute corresponding to the minimum margin value. The normalized minimum margin value is applied to quantify and define a health index (HI) for each pairing of the first and second input parameters of the equipment. In an embodiment, the HI is used to project the change of the efficiency and flow pairing, such as shown in the chart 600 into the margin domain as shown in FIG. 7, and will be discussed further below. The HI will be defined based upon a most limiting operational margin value. It will be assumed that if any margin value within the equipment, with a defined first and second input parameter pairing, violates the minimum margin value corresponding to the specific operating conditions 105, a current value of the HI of the equipment will be zero. Otherwise, the current value of the HI of the equipment is the current value of the normalized margin of a set of the normalized margins that has a minimum value.

Referring now to FIG. 7, a chart 700 including a normalized minimal margin surface 710 of the HPC equipment fault is depicted. In an embodiment, the normalized minimal margin surface 710 relates the health index along a first axis 740 with a flow along a second axis 750, and the health index with the efficiency along a third axis 760. In an embodiment, the normalized minimal margin surface 710 will include the margin that has been determined to have the lowest HI within the equipment of interest. A contour line 720 represents a boundary of zero margin. The contour line 720 indicates that any flow and efficiency pairings beyond the line 720, that is, not within an area 730 of the surface 710, has a minimal margin less than zero, and therefore a health index equal to zero.

In an embodiment, collecting a plurality of HI values over time, with each HI value determined by a pairing of efficiency and flow, will allow for the defining of a minimal margin trajectory on the minimal margin surface 710. In an embodiment, the process continues by projecting 460 the health index values of the minimal margin trajectory into a time domain. An embodiment includes collecting and assessing a plurality of operational data, such as the collected HI values, prior to an end of equipment useful life.

Figure 8:
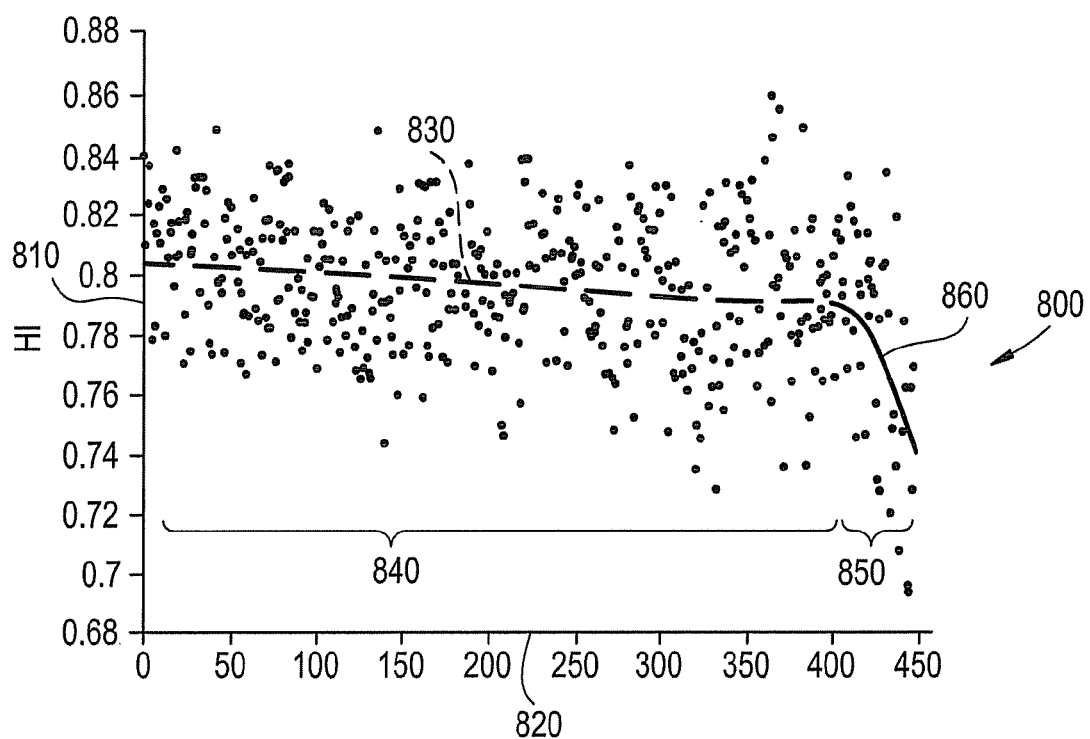
FIG. 8 depicts a chart including a time projection of health index (HI) values in accordance with an embodiment of the invention.

Referring now to FIG. 8, a chart 800 depicts a projection of HI values, derived by the minimal margin surface 710, into the time domain. The chart 800 includes a first axis 810 that relates the HI value of each first and second input parameter pairing of the equipment with time, which is shown along a second axis 820. In an embodiment, an exemplary HI trajectory, or health assessment curve 830 is defined as a plotted line among, or approximating, many individual HI values. Under normal operating conditions, represented by a dashed line within a first portion 840, a typical HI trajectory 830 will drop at a steady pace, with a small slope that is reflective of normal equipment deterioration. However, subsequent to an initiation of a fault, as represented by a solid line within a second portion 850, the slope of the HI trajectory 830 will decrease dramatically, and the HI trajectory 830 will drop significantly downward. HI trajectories 830 are recorded to a point where maintenance is performed, prior to an end of useful equipment life. A curve fitting extrapolator (represented by reference numeral 460 in FIG. 4) will fit an extrapolated curve 860 for the time period subsequent to fault initiation, within the second portion 850. The extrapolated curve 860 can be fit to several different functions. In an embodiment, the curve 860 is an exponentially decaying curve 860. In another embodiment, the curve function is $y=b+m\cdot(1-e^{\alpha\cdot x^n})$, where b is a value at a fault initiation point, m is a multiplier, such as m=2, for example, $\alpha$ is a modifier, and n is an exponent, such as n=2.5, for example.

An embodiment of the invention continues by finding an intersection of the extrapolated curve 860 and the constant HI=0, depicted graphically as an x-axis 464 of a chart 465 in FIG. 4, which represents a mean of the RUL prediction 470 at this time step.

In an embodiment, a statistical technique known as backward chaining can be employed to compare expected sensor data with real sensor measurements 410 and provide a mechanism to assess a validity of the process. In an embodiment, efficiency and flow pairings that correspond to a set of extrapolated HI points defined by the extrapolated curve 860 are discretized 480, and used as input to the cycle deck 125. The cycle deck 125 is run 490 with the discretized efficiency and flow pairings 485 that correspond to the extrapolated HI points as inputs. In an embodiment, resulting expected sensor outputs defined by the cycle deck 125 are compared with the signals representative of real sensor outputs 410 in response to operation. Comparison of the real sensor outputs to the expected sensor outputs can indicate a need for an adjustment of the RUL estimates. In an embodiment, a distribution of flow and efficiency pairings can be input to the cycle deck 125, which will produce operational events at different times, to thereby provide a distribution of RUL estimates 470. Accordingly, in an embodiment, this distribution of RUL estimates 470 can be used as an uncertainty estimation tool to determine a confidence level of the RUL estimate 470.

Referring now to FIG. 9, FIG. 10, and FIG. 11, results from a test using the damage propagation modeling processes herein disclosed are depicted. FIG. 9, FIG. 10, and FIG. 11 include contour charts that depict isolines defining HI values as related to flow and efficiency pairings of an HPC, HPT, and LPT, respectively, of a same aircraft engine, during a same test period of time. Efficiency and flow capacity for each equipment of the engine (HPC, HPT, and LPT) are estimated and minimal margin surfaces are plotted. Dashed lines 902, 904, 906 each indicate the zero margin boundary, representing the HI value of zero. A star 912, 914, 916 represents an HI value at a start of the test period, and an asterisk 913, 915, 917 represents an HI value at an end of the test period. A compressor fault (within the HPC) occurred and the HPC eventually reached an end of useful life at the end of the test period. Closely observing the HPC health index contour chart in FIG. 9, it will be appreciated that a trajectory 920 of the HPC HI has moved beyond the zero margin boundary 902. It will be further appreciated that a trajectory 922 of the HPT and a trajectory 924 of the LPT depicted in FIG. 10 and FIG. 11 have remained within the respective zero margin boundaries 904, 906, thereby indicating that an end of useful life of those pieces of equipment has not yet been reached.

Figure 12:
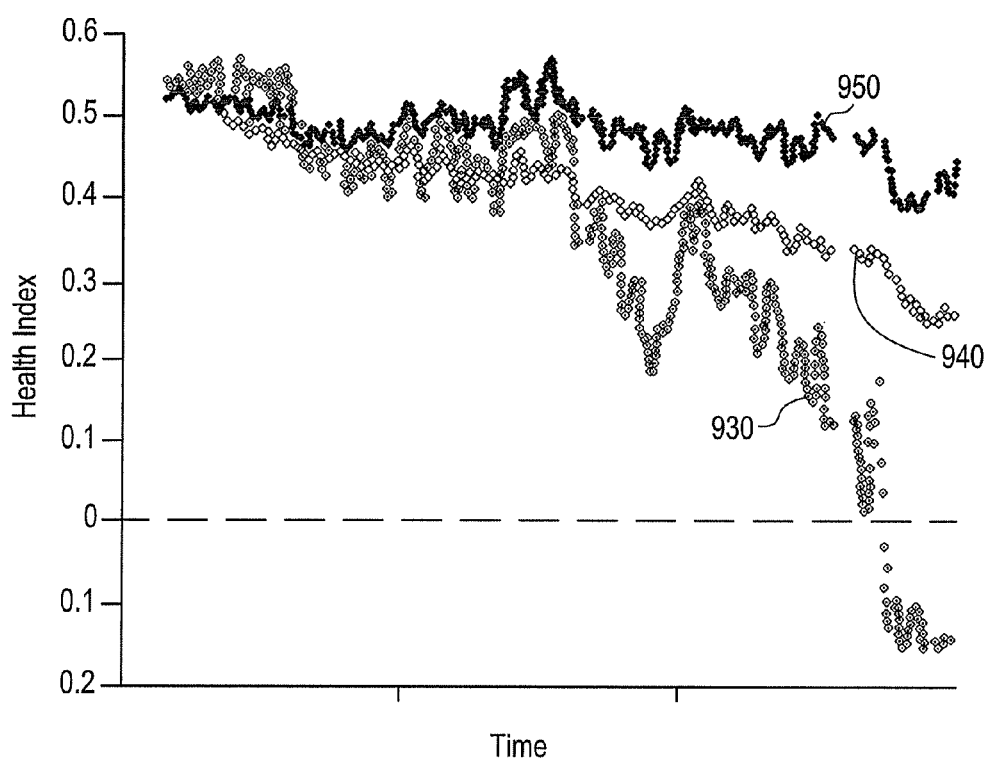
FIG. 12 depicts a chart including a time projection of the flow and efficiency trajectories depicted in FIG. 9, FIG. 10, and FIG. 11 in accordance with an embodiment of the invention.

Referring now to FIG. 12, a projection of the HI trajectories 920, 922, 924, depicted in FIGS. 9, 10, and 11, into the time domain is depicted. A plurality of points indicated by reference numeral 930 represent the HI trajectory 920 of the HPC, a plurality of points indicated by reference numeral 940 represents the HI trajectory 922 of the HPT, and a plurality of points indicated by reference numeral 950 represents the HI trajectory 924 of the LPT. It will be appreciated that, as depicted in FIG. 9, the HI value of the HPC (compressor) equipment falls below zero, indicating an end of the useful life of the HPC equipment. It will be further appreciated that the HI values of the HPT and LPT do not fall below zero.

Figure 13:
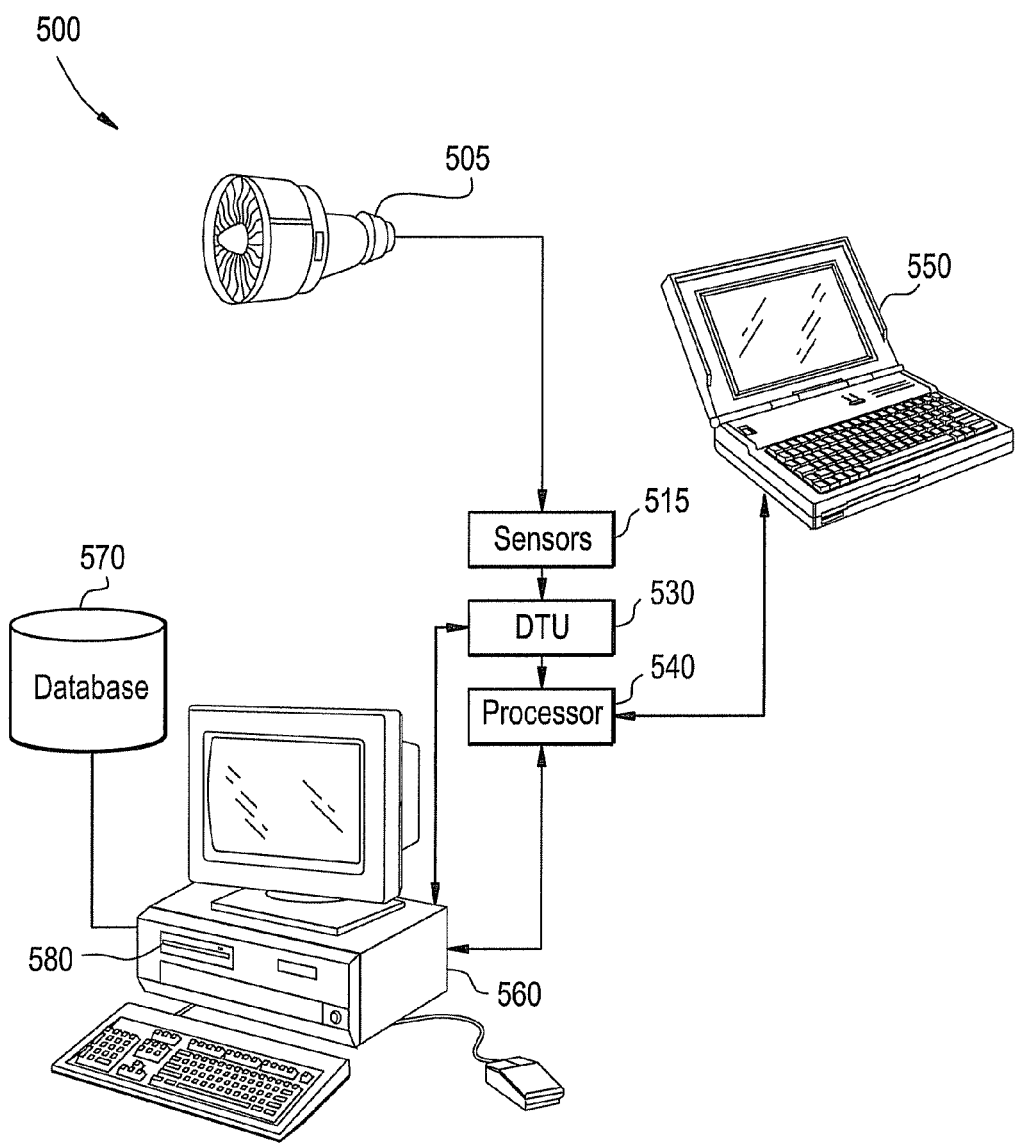
FIG. 13 depicts a schematic diagram of a prediction system in accordance with an embodiment of the invention.

Referring now to FIG. 13, an exemplary embodiment of a prediction system 500 is depicted. In an embodiment, the prediction system includes a turbine engine 505, at least one actual sensor 515, a data transfer unit (DTU) 530, a processor 540, an interface unit 550, a computer 560, and a database 570. The computer 560 further includes a program storage device 580.

While an embodiment of the invention has been described as estimating damage propagation and predicting remaining useful life of an aircraft turbine engine, it will be appreciated that the scope of the invention is not so limited, and that the invention will also apply to damage propagation estimation and remaining useful life prediction arrangements for other equipment, such as power generators, locomotive engines, rolling mills, and medical equipment, for example.

In an embodiment, the at least one sensor 515 includes a plurality of sensors, each of the plurality of sensors configured to be responsive to an operating characteristic of the engine 505, and to generate a signal representative of the operating condition of the engine 505. In an embodiment, the at least one sensor 515 is in signal communication with the data transfer unit 530, which makes available to the processor 540 the signal representative of the operating characteristic of the engine 505, thereby allowing the processor 540 to access the signal representative of the operating characteristic of the engine 505.

In an embodiment, the processor 540 is in signal communication with an interface device 550, such as to allow for the on-line monitoring process, as described herein. In an embodiment, the processor 540 is also in signal communication with the computer 560. In an embodiment, the computer 560 is in signal communication with the database 570, which is configured to store and make available to the computer 560 the set of input parameters 104. The computer 560 also includes the program storage device 580 configured to store, and make available to the computer 560 for execution, the computational model 125. In an embodiment, the computational model 125 is a physics-based computational model, also known as a cycle deck, to simulate operation of the turbine engine 505.

While an embodiment of the invention has been described having a computer in signal communication with the processor, it will be appreciated that the scope of the invention is not so limited, and that the invention will also apply to prediction systems that have the computer in direct signal communication with the data transfer unit. It will be further appreciated that an embodiment of the invention will also include the computer in signal communication via the data transfer unit via a variety of communication protocols, such as cellular, wireless internet, and others, for example, to allow an connection between the computer and the data transfer unit during use of the equipment, to enable a remote, on-line monitoring process.

In view of the foregoing, the prediction system 500 performs the method of estimating damage propagation. Referring now to FIG. 14, an embodiment of a generalized flow-chart 600 of an exemplary method of predicting equipment life is depicted.

In an embodiment, the method begins with making available 575 the set of input parameters 104 to the computational model 125, executing 580 the computational model 125 with defined changes within the range of the input parameter of the set of input parameters 104 to define the modeled sensor output, receiving 582 at least one signal responsive to and representative of the respective one the actual sensor output 410, and estimating 585 damage propagation based upon the correlation of the received signal to the modeled sensor output, and generating 586 the signal corresponding to the damage propagation. In an embodiment, the estimating 585 includes assessing a plurality of operational data prior to the end of equipment useful life. In an embodiment, the signal corresponding to the estimated damage propagation will cause the estimated damage propagation to be displayed via at least one of the computer 560 and the interface device 550.

In an embodiment, the making available 575 the set of input parameters includes supplying the first range of the first input parameter and the second range of the second input parameter, and the executing 580 the computational model 125 includes defining the response map 132 of the modeled sensor output in response to defined changes within the first range of the first input parameter and defined changes within the second range of the second input parameter. In an embodiment, the making available the set of input parameters comprises supplying the set of input parameters 104 of the turbine engine 505, the first input parameter is the efficiency parameter, and the second input parameter is the flow parameter.

In an embodiment, the receiving 582 includes receiving more than one signal responsive to and representative of more than one actual sensor output 410, and the executing 580 includes defining more than one response map 132, each of the more than one response maps 132 corresponding to the respective one of the more than one received signal. The method further includes normalizing each of the more than one received signals and corresponding more than one response maps 132 with respect to a reference value. In an embodiment, the reference value is the value of the respective one of the more than one received signals. In another embodiment, the reference value is the maximum value of the respective response surface 132. The method further includes superimposing together the more than one normalized received signals and corresponding more than one normalized response maps, and determining a collective best match of the more than one superimposed normalized received signals with each of the corresponding more than one superimposed normalized response maps. In an embodiment, the determining the best match includes estimating an estimated health related pairing of the first input parameter and the second input parameter.

An embodiment of the method includes determining the best match via applying the function:

$$\min(\Sigma w_i (dist_i)^2), i \in \{characteristic\} \qquad \text{equation-1}$$

where $w_i$ represents a weighting function, $dist_i$ represents a distance from the more than one superimposed normalized received signals to the corresponding more than one superimposed normalized response maps, and characteristic represents an operating characteristic corresponding to each of the more than one received signals.

An embodiment of the method proceeds by defining the change of the best match in response to the change in the more than one received signal, and measuring the trajectory and a rate of the change of the best match. In an embodiment, the method further includes determining the direction of the change of the best match and interpreting the direction to define a diagnostic finding. An embodiment of the method further proceeds by defining the health index based upon the most limiting operational margin of the set of operational margins, and projecting the trajectory of the change of the best match into a one-dimensional margin domain including the health index to define a minimal margin trajectory over time, thereby providing the health assessment curve.

An embodiment of the method extrapolating the health assessment curve to predict the remaining useful equipment life. To predict the remaining equipment useful life, the health assessment curve is extrapolated to a zero value of the health index. In an embodiment, the extrapolating includes fitting the health assessment curve to the exponentially decaying curve function.

An embodiment of the method further includes discretizing the pairing of the first input parameter and the second input parameter relating to the extrapolated health assessment curve, executing the computational model 125 with the discretized pairing to define the modeled sensor output, and comparing the received signal that corresponds to the modeled sensor output defined in response to the discretized pairing with the corresponding modeled sensor output. In an embodiment the method further includes establishing the confidence level based upon the comparing the received signal with the corresponding expected sensor output defined in response to the discretized pairing.

An embodiment of the invention may be embodied in the form of computer-implemented processes and apparatuses for practicing those processes. Embodiments of the invention may also be embodied in the form of a computer program product having computer program code containing instructions embodied in tangible media, such as floppy diskettes, CD-ROMs, hard drives, USB (universal serial bus) drives, or any other computer readable storage medium, wherein, when the computer program code is loaded into and executed by a computer, the computer becomes an apparatus for practicing the invention. Embodiments of the invention may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to estimate a propagation of damage of equipment.

As disclosed, some embodiments of the invention may include some of the following advantages: the ability to map sensor measurements to a point in the flow-efficiency space of an engine module; the ability to derive directional information from the flow-efficiency space; the ability to determine the rate of change of flows and efficiencies; the ability to estimate a flow-efficiency pairing of an engine equipment from sensor measurements; the ability to project the change of the estimated flow-efficiency pairing into the margin domain including various operating conditions; the ability to project the change of the estimated flow-efficiency pairing into the health index/time domain; the ability to extrapolate health assessment curve to determine the remaining useful life of the equipment; the ability to discretize the path of extrapolated curve to find extrapolated flow-efficiency pairings; the ability to run the cycle deck with the extrapolated flow-efficiency pairings to produce anticipated sensor readings to confirm the operational limit at the marginal efficiencies and flows; and the ability to provide an equipment remaining useful life estimation absent full damage propagation models or run to end of equipment useful life data.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A program storage device readable by a computer, the device embodying a program or instructions executable by the computer to perform a method to estimate damage propagation comprising:

making available a set of input parameters to a computational model;

executing the computational model with defined changes within a range of an input parameter of the set of input parameters to define a range of at least one modeled output;

receiving at least one signal responsive to and representative of a respective one of an actual sensor output;

estimating damage propagation based upon a correlation of the received signal to the modeled output; and generating a signal corresponding to the damage propagation, wherein:

the making available comprises supplying a first range of a first input parameter and a second range of a second input parameter;

the executing comprises defining a response map of the modeled output in response to defined changes within the first range of the first input parameter and defined changes within the second range of the second input parameter; and the receiving comprises receiving more than one signal responsive to and representative of more than one actual sensor output and the executing comprises defining more than one response map, each of the more than one response maps corresponding to a respective one of the more than one received signals, the method further comprising:

normalizing each of the more than one received signals and corresponding more than one response maps with respect to a reference value;

superimposing the more than one normalized received signals and corresponding more than one normalized response maps; and determining a collective best match of the more than one superimposed normalized received signals with the corresponding more than one superimposed normalized response maps.

2. The program storage device of claim 1, wherein the estimating comprises:

assessing a plurality of operational data prior to an end of equipment useful life.

3. The method pro ram storage device of 1, wherein:

the making available comprises supplying the first range of an efficiency parameter of a turbine engine and the second range of a flow parameter of the turbine engine; and the executing comprises defining the response map in response to defined changes within the first range of the efficiency parameter and defined changes within the second range of the flow parameter.

4. The program storage device of claim 1, wherein the determining comprises:

estimating a health related pairing.

5. The program storage device of claim 1, wherein the determining comprises applying a function:

$$\min(\Sigma w_i(\text{dist}_i)^2), i \in \{\text{characteristic}\}$$

wherein:

$w_i$ represents a weighting function $\text{dist}_i$ represents a distance from the more than one superimposed normalized received signals to the corresponding more than one superimposed normalized response maps; and characteristic represents an operating characteristic corresponding to each of the more than one received signals.

6. The program storage device of claim 1, further comprising:

defining a change of the best match in response to a change in the more than one received signal; and measuring a trajectory and a rate of the change of the best match.

7. The program storage device of claim 6, further comprising:

determining a direction of the change of the best match; and interpreting the direction to define a diagnostic finding.

8. The program storage device of claim 6, further comprising:

defining a health index based upon a most limiting operational margin of a set of operational margins; and projecting the trajectory of the change of the best match into a one-dimensional margin domain comprising the health index to define a minimal margin trajectory over time, thereby providing a health assessment curve.

9. The program storage device of claim 8, further comprising:

extrapolating the health assessment curve to predict a remaining useful equipment life.

10. The method of claim 9, wherein:

the extrapolating comprises extrapolating the health assessment curve to a value of the health index equal to zero.

11. The method program storage device of claim 9, wherein:

the extrapolating comprises fitting the health assessment curve to an exponentially decaying curve function.

12. The program storage device of claim 9, further comprising:

discretizing a pairing of the first input parameter and the second input parameter relating to the extrapolated health assessment curve;

executing the computational model with the discretized pairing to define the modeled output; and comparing the received signal with a corresponding modeled output.

13. The program storage device of claim 12, further comprising:

establishing a confidence level based upon the comparing the received signal with the corresponding modeled output defined in response to the discretized pairing.

14. A system for estimating damage propagation, the system comprising:

a database comprising a set of input parameters;

a processor in signal communication with the database; and a computational model application for executing on the processor, the computational model application performing a method, the method comprising:

defining a range of at least one modeled output based upon a range of an input parameter of the set of input parameters;

receiving at least one signal responsive to and representative of a respective one of an actual sensor output;

estimating damage propagation based upon a correlation of the received signal to the modeled output; and generating a signal corresponding to the damage propagation, wherein:

the set of input parameters comprises a first range of a first input parameter and a second range of a second input parameter;

the defining the range of at least one modeled output comprises defining a response map of the modeled output in response to defined changes within the first range of the first input parameter and defined changes within the second range of the second input parameter;

the receiving comprises receiving more than one signal responsive to and representative of more than one actual sensor output and the defining comprises more than one response map, each of the more than one response maps corresponding to the respective one of the more than one received signal, and wherein the computational model application further performs:

normalizing each of the more than one received signals and corresponding more than one response maps with respect to a reference value;

superimposing the more than one normalized received signals and corresponding more than one normalized response maps;

determining a collective best match of the more than one superimposed normalized received signals with the corresponding more than one superimposed normalized response maps;

defining a change of the best match in response to a change in the more than one received signal; and measuring a trajectory and a rate of the change of the best match.

15. The system of claim 14, wherein:

the estimating comprises assessing a plurality of operational data prior to an end of equipment useful life.

16. The system of claim 14, wherein:

the set of input parameters comprise the first range of an efficiency parameter of a turbine engine and the second range of a flow parameter of the turbine engine; and the defining the response map comprises defining the response map in response to defined changes within the first range of the efficiency parameter and defined changes within the second range of the flow parameter.

17. The system of claim 14, wherein the computational model application further performs:

defining a health index based upon a most limiting operational margin of a set of operational margins; and projecting the trajectory of the change of the best match into a one-dimensional margin domain comprising the health index to define a minimal margin trajectory over time, thereby providing a health assessment curve.

18. The system of claim 17, wherein the computational model application further performs:

extrapolating the health assessment curve to predict a remaining useful equipment life.

19. The system of claim 18, wherein the computational model application further performs:

discretizing a pairing of the first input parameter and the second input parameter relating to the extrapolated health assessment curve;

defining the modeled output in response to the discretized pairing; and comparing the received signal with a corresponding modeled output defined in response to the discretized pairing.

20. The system of claim 19, wherein the computational model application further performs:

establishing a confidence level based upon the comparing the received signal with the corresponding modeled output.

* * * * *

UNITED STATES PATENT AND TRADEMARK OFFICE
CERTIFICATE OF CORRECTION

| | |
|---|---|
| PATENT NO. | : 7,933,754 B2 |
| APPLICATION NO. | : 11/608036 |
| DATED | : April 26, 2011 |
| INVENTOR(S) | : Goebel et al. |

It is certified that error appears in the above-identified patent and that said Letters Patent is hereby corrected as shown below:

In Column 5, Line 36, delete "216." and insert -- 210. --, therefor.

In Column 13, Line 47, in Claim 3, delete "method pro ram" and insert -- program --, therefor.

In Column 13, Line 47, in Claim 3, delete "1," and insert -- claim 1, --, therefor.

In Column 15, Line 30, in Claim 11, delete "method program" and insert -- program --, therefor.

Signed and Sealed this
Thirty-first Day of January, 2012

David J. Kappos
*Director of the United States Patent and Trademark Office*